(12) United States Patent
Shelnutt et al.

(10) Patent No.: US 11,099,545 B2
(45) Date of Patent: Aug. 24, 2021

(54) SYSTEMS AND METHODS FOR POWER AND COOLING CONTROL OF EXPANSION CHASSIS USING HOST INTERFACE CARD SIDEBAND SIGNALS

(71) Applicant: Dell Products L.P., Round Rock, TX (US)

(72) Inventors: Austin M. Shelnutt, Leander, TX (US); Shih-Tien Cheng, Taipei (TW)

(73) Assignee: Dell Products L.P., Round Rock, TX (US)

( * ) Notice: Subject to any disclaimer, the term of this patent is extended or adjusted under 35 U.S.C. 154(b) by 153 days.

(21) Appl. No.: 16/373,400

(22) Filed: Apr. 2, 2019

(65) Prior Publication Data
US 2020/0319624 A1 Oct. 8, 2020

(51) Int. Cl.
| G05B 19/4155 | (2006.01) |
| G06F 13/20 | (2006.01) |
| G06F 13/42 | (2006.01) |

(52) U.S. Cl.
CPC ......... *G05B 19/4155* (2013.01); *G06F 13/20* (2013.01); *G06F 13/4282* (2013.01); *G05B 2219/49216* (2013.01); *G06F 2213/0026* (2013.01)

(58) Field of Classification Search
CPC ...... G05B 19/4155; G05B 2219/49216; G06F 13/20; G06F 13/4282; G06F 2213/0026
See application file for complete search history.

(56) References Cited

U.S. PATENT DOCUMENTS

| 6,078,402 A * | 6/2000 | Fischer | G06F 3/1204 |
| | | | 358/1.1 |
| 2016/0291654 A1* | 10/2016 | Iyer | G05B 15/02 |
| 2017/0052919 A1* | 2/2017 | Purcell | H05K 7/1438 |
| 2017/0109185 A1* | 4/2017 | Khemani | G06F 9/45558 |
| 2017/0270060 A1* | 9/2017 | Gupta | G06F 13/4068 |
| 2018/0189224 A1* | 7/2018 | Vadivelu | G06F 13/4022 |

\* cited by examiner

*Primary Examiner* — Henry Tsai
*Assistant Examiner* — Aurangzeb Hassan
(74) *Attorney, Agent, or Firm* — Jackson Walker L.L.P.

(57) ABSTRACT

An information handling system may include a main chassis and a motherboard-less expansion chassis. The main chassis may include a host system motherboard and a first host interconnect card. The motherboard-less expansion chassis may include a second host interconnect card communicatively coupled to the first interconnect card via an external cable having one or more in-band signal channels and one or more sideband signal channels, a first information handling resource configured to communicate data with the host system motherboard via the one or more in-band signal channels, and a second information handling resource configured to communicate control signals with the host system motherboard via the one or more sideband signal channels.

12 Claims, 1 Drawing Sheet

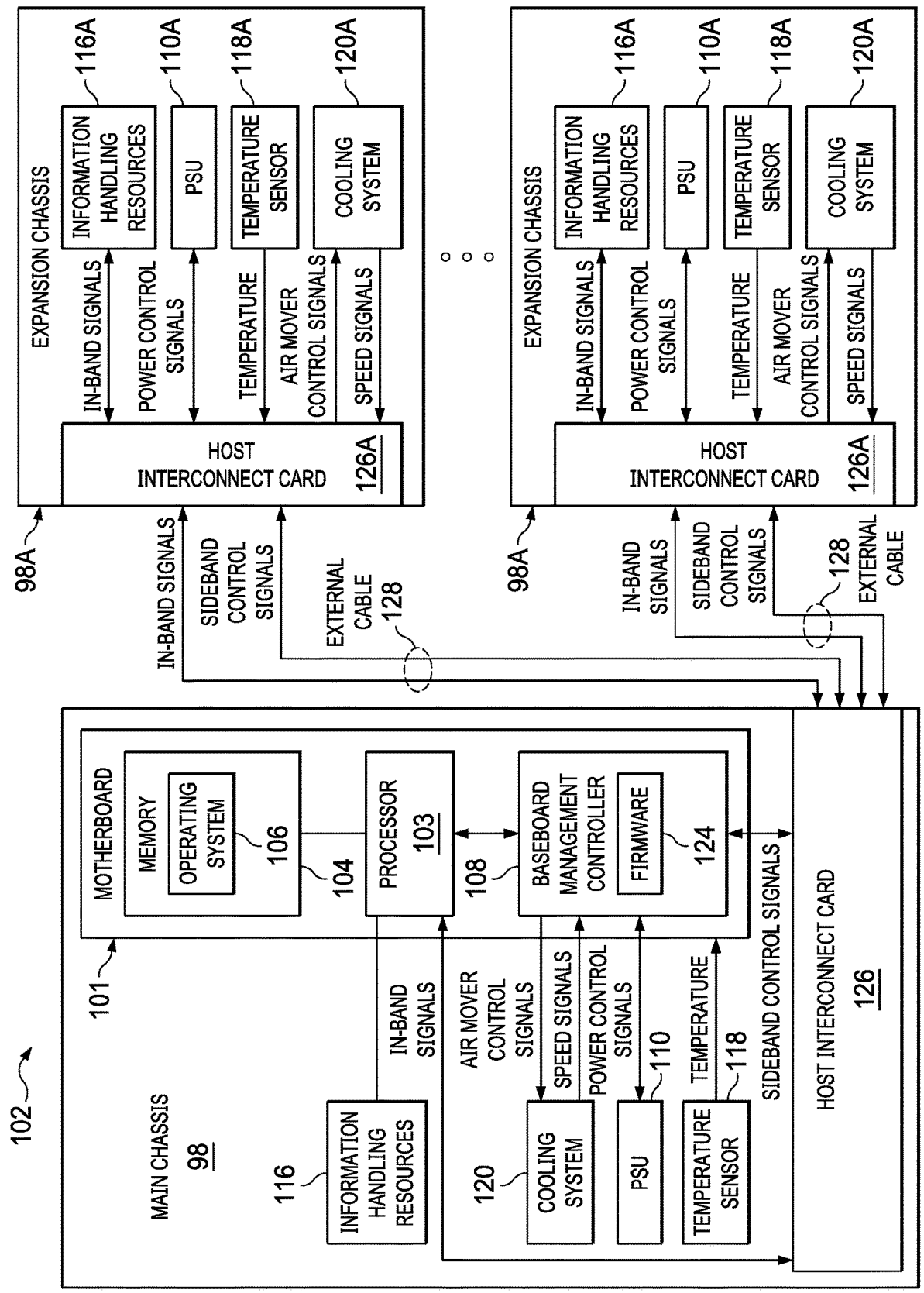

SYSTEMS AND METHODS FOR POWER AND COOLING CONTROL OF EXPANSION CHASSIS USING HOST INTERFACE CARD SIDEBAND SIGNALS

TECHNICAL FIELD

The present disclosure relates in general to information handling systems, and more particularly to enabling control of power and cooling subsystems of an expansion chassis of an information handling subsystem using host interface card sideband signals.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Applications requiring massive amounts of computational resources, including deep learning and other forms of artificial intelligence, have given way to increased demands for computing resources served by graphics processing units, field-programmable gate arrays, and other application-specific integrated circuit solutions that are coupled to host computing nodes via a Peripheral Component Interconnect Express (PCiE) interface. With this increased demand also comes varying demands in terms of the number of computing resources required, from two graphics processing units to up to 32 graphics processing units.

To meet this fluid demand, an information handling system may be designed to include both a host in-server solution implemented with a "main" chassis and an expansion chassis without a motherboard. Such expansion chassis may allow for scale to meet a diverse set of compute, network, and storage requirements.

However, one key challenge with such an expansion chassis is the management of expansion chassis power and cooling without having a local management controller (e.g., baseboard management controller) within the expansion chassis.

SUMMARY

In accordance with the teachings of the present disclosure, the disadvantages and problems associated with power and cooling control of an information handling system having an expansion chassis may be reduced or eliminated.

In accordance with embodiments of the present disclosure, an information handling system may include a main chassis and a motherboard-less expansion chassis. The main chassis may include a host system motherboard and a first host interconnect card. The motherboard-less expansion chassis may include a second host interconnect card communicatively coupled to the first interconnect card via an external cable having one or more in-band signal channels and one or more sideband signal channels, a first information handling resource configured to communicate data with the host system motherboard via the one or more in-band signal channels, and a second information handling resource configured to communicate control signals with the host system motherboard via the one or more sideband signal channels.

In accordance with these and other embodiments of the present disclosure, a method may include, in an information handling system comprising a main chassis having a host system motherboard and a motherboard-less expansion chassis, disposing in the main chassis a first host interconnect card and coupling the first host interconnect card to the host system motherboard, disposing in the expansion chassis a second host interconnect card, coupling an external cable having one or more in-band signal channels and one or more sideband signal channels between the first host interconnect card and the second host interconnect card, coupling the second host interconnect card to a first information handling resource of the expansion chassis such that the first information handling resource is configured to communicate data with the host system motherboard via the one or more in-band signal channels, and coupling the second host interconnect card to a second information handling resource of the expansion chassis such that the second information handling resource is configured to communicate control signals with the host system motherboard via the one or more sideband signal channels.

In accordance with these and other embodiments of the present disclosure, an article of manufacture may include a non-transitory computer readable medium and computer-executable instructions carried on the computer readable medium. The instructions may be readable by a processor, and may be configured to, when read and executed, cause the processor to, in an information handling system comprising a main chassis having a host system motherboard and a first host interconnect card and a motherboard-less expansion chassis having a second host interconnect card communicatively coupled to the first interconnect card via an external cable having one or more in-band signal channels and one or more sideband signal channels: communicate data between the host system motherboard and a first information handling resource integral to the expansion chassis and via the one or more in-band signal channels; and communicate data between the host system motherboard and a second information handling resource integral to the expansion chassis and via the one or more sideband signal channels.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWING

A more complete understanding of the present embodiments and advantages thereof may be acquired by referring to the following description taken in conjunction with the accompanying drawing, in which like reference numbers indicate like features, and wherein:

THE FIGURE illustrates a block diagram of an example information handling system including a main chassis and a plurality of expansion chassis, in accordance with embodiments of the present disclosure.

DETAILED DESCRIPTION

Preferred embodiments and their advantages are best understood by reference to THE FIGURE, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

THE FIGURE illustrates a block diagram of an example information handling system 102 including a main chassis 98 and a plurality of expansion chassis 98A, in accordance with embodiments of the present disclosure. In some embodiments, information handling system 102 may comprise a server. As depicted in THE FIGURE, information handling system 102 may include a main chassis 98 and one or more expansion chassis 98A coupled to the main chassis. In some embodiments, each expansion chassis 98A may be coupled to main chassis 98 via a respective external cable 128 (e.g., a PCIe cable) capable of carrying in-band signals and sideband control signals, as described in greater detail below.

As shown in THE FIGURE, main chassis 98 may include a motherboard 101, a power supply unit (PSU) 110, a temperature sensor 118, a cooling system 120, a host interconnect card 126, and one or more information handling resources 116.

Motherboard 101 may include a circuit board configured to provide structural support for one or more information handling resources of information handling system 102 and/or electrically couple one or more of such information handling resources to each other and/or to other electric or electronic components external to information handling system 102. As shown in THE FIGURE, motherboard 101 may include a processor 103, memory 104, a baseboard management controller 108, and one or more other information handling resources.

Processor 103 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

As shown in THE FIGURE, memory 104 may have operating system 106 stored thereon. Operating system 106 may be any program of executable instructions, or aggregation of programs of executable instructions, configured to manage and/or control the allocation and usage of hardware resources (e.g., processor 103, memory 104, and/or other information handling resources 116) and provide an interface between such hardware resources and application programs hosted by operating system 106, and thus may act as a host for application programs to be executed by information handling system 102. Active portions of operating system 106 may be read and executed by processor 103 in order to carry out the functionality of operating system 106. Examples of operating system 106 may include, without limitation, Windows, MacOS, UNIX, LINUX, Android, iOS, or any other closed or open source operating system.

A baseboard management controller 108 may be configured to provide out-of-band management facilities for management of information handling system 102. Such management may be made by baseboard management controller 108 even if information handling system 102 is powered off or powered to a standby state. In certain embodiments, baseboard management controller 108 may include or may be an integral part of a remote access controller (e.g., a Dell Remote Access Controller or Integrated Dell Remote Access Controller).

Firmware 124 may comprise any program of executable instructions, or aggregation of programs of executable instructions, configured to perform the functionality of baseboard management controller 108, including managing and/or controlling PSU 110 and/or cooling system 120, receiving telemetry information from PSU 110, cooling system 120, and temperature sensor 118, and managing, controlling, and/or receiving telemetry information from PSUs 110A, temperature sensors 118A, cooling systems 120A, and/or other information handling resources of expansion chassis 98A. In addition, firmware 124 may include all or a portion of a network stack for network communication via a network interface (e.g., network interface 118 for communication over a management network). Active portions of firmware 124 may be executed by a processor integral to baseboard management controller 108. In some embodiments, firmware 124 may be implemented with an operating system, such as Linux, for example.

In some embodiments, baseboard management controller 108 may be configured to communicate with PSU 110 to communicate control and/or telemetry data between baseboard management controller 108 and PSU 110 (e.g., via a Power Management Bus). For example, PSU 110 may communicate information regarding status and/or health of PSU 110 and/or measurements of electrical parameters (e.g., electrical currents or voltages) present within PSU 110, and baseboard management controller 108 may be configured to communicate control signals to PSU 110 for enabling or otherwise controlling operation of PSU 110.

In these and other embodiments, baseboard management controller 108 may be configured to communicate with temperature sensor 118 to receive telemetry data (e.g., one or more signals indicative of a temperature) from temperature sensor 118. For example, temperature sensor 118 may communicate a temperature signal indicative of a temperature within main chassis 98. In some embodiments, such temperature signals may be communicated via an Intelligent Platform Management Interface (IPMI).

In some embodiments, baseboard management controller 108 may be configured to communicate with cooling system 120 to communicate control and/or telemetry data between baseboard management controller 108 and cooling system 120. For example, cooling system 120 may communicate information regarding status and/or health of cooling system 120 and/or measurements of electrical parameters (e.g., tachometer signals indicative of a speed of an air mover) present within cooling system 120, and baseboard management controller 108 may be configured to communicate control signals to cooling system 120 for enabling or otherwise controlling operation of cooling system 120 (e.g., air mover control signals for controlling a speed of one or more air movers integral to cooling system 120).

A PSU 110 may include any system, device, or apparatus configured to supply electrical current to one or more information handling resources (e.g., motherboard 101, information handling resources 116, temperature sensor 118, cooling system 120, host interconnect card 126, etc.) of main chassis 98.

Cooling system 120 may be communicatively coupled to baseboard management controller 108, and may include any mechanical or electro-mechanical system, apparatus, or device operable to move coolant (e.g., air, other gases, liquids) throughout main chassis 98. In some embodiments, cooling system 120 may comprise a fan (e.g., a rotating arrangement of vanes or blades which act on a gaseous coolant such as air). In other embodiments, cooling system 120 may comprise a blower (e.g., a centrifugal fan that employs rotating impellers to accelerate gaseous cooling received at its intake and change the direction of the airflow) . In operation, in the case of a cooling system 120 including an air mover (e.g., fan or blower), the air mover may cool information handling resources 116 of main chassis 98 by drawing cool air into main chassis 98 from the outside of main chassis 98, expelling warm air from inside the enclosure to the outside of main chassis 98, and/or moving air across one or more heatsinks (not explicitly shown) internal to main chassis 98 to cool one or more information handling resources 116.

In other embodiments, cooling system 120 may comprise mechanisms other than a blower for moving coolant, including liquid pumps, jets, and/or free convection enclosures.

In these and other embodiments, rotating and other components for moving coolant by cooling system 120 may be driven by a motor or other mechanical device. The rotational speed of such motor may be controlled by suitable control signals communicated from baseboard management controller 108 to cooling system 120.

Temperature sensor 118 may be any system, device, or apparatus (e.g., a thermometer, thermistor, etc.) configured to communicate a signal to baseboard management controller 108 indicative of a temperature within main chassis 98. In many embodiments, main chassis 98 may comprise a plurality of temperature sensors 118, wherein each temperature sensor 118 detects a temperature of a particular component and/or location within main chassis 98. For example, one temperature sensor 118 may detect an ambient temperature of coolant entering main chassis 98 via cooling system 120 while another temperature sensor 118 may detect a temperature of one or more information handling resources 116.

Host interconnect card 126 may comprise any suitable system, device, or apparatus configured to serve as a communication interface between main chassis 98 and expansion chassis 98A external to main chassis 98. As shown in THE FIGURE, host interconnect card 126 may be configured to receive in-band signals from processor 103 and/or send in-band signals to processor 103. In addition, host interconnect card 126 may be configured to receive sideband control signals from baseboard management controller 108 and/or send sideband control signals to baseboard management controller 108.

As also shown in THE FIGURE, host interconnect card 126 may be coupled to one or more expansion chassis 98A, each via an external cable 128. Each external cable 128 may communicatively couple host interconnect card 126 to a respective host interconnect card 126A of a respective expansion chassis 98A. As shown in THE FIGURE, an external cable 128 may have one or more channels for communicating in-band signals between host interconnect card 126 and a host interconnect card 126A and one or more channels for communicating sideband control signals between host interconnect card 126 and a host interconnect card 126A.

In addition to processor 103, memory 104, baseboard management controller 108, PSU 110, cooling system 120, temperature sensor 118, and host interconnect card 126, main chassis 98 may include one or more other information handling resources 116. Such information handling resources 116 may include any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system. For example, in some embodiments, one or more information handling resources 116 may comprise PCIe devices.

As shown in THE FIGURE, an expansion chassis 98A may include a PSU 110A, a temperature sensor 118A, a cooling system 120A, a host interconnect card 126A, and one or more information handling resources 116A. Most notably, an expansion chassis 98A may not include a motherboard 101.

A PSU 110A may include any system, device, or apparatus configured to supply electrical current to one or more information handling resources (e.g., information handling resources 116A, temperature sensor 118A, cooling system 120A, host interconnect card 126A, etc.) of expansion chassis 98A. In some embodiments, PSU 110A may be configured to receive suitable control signals communicated from baseboard management controller 108 via external cable 128, as described in greater detail below. In these and other embodiments, PSU 110A may be configured to communicate (e.g., via external cable 128 as described in greater detail below) one or more signals to baseboard management controller 108 indicative of a health, status, and/or other telemetry information regarding PSU 110A.

Cooling system 120A may include any mechanical or electro-mechanical system, apparatus, or device operable to move coolant (e.g., air, other gases, liquids) throughout expansion chassis 98A. In some embodiments, cooling system 120A may comprise a fan (e.g., a rotating arrangement of vanes or blades which act on a gaseous coolant such as air). In other embodiments, cooling system 120A may comprise a blower (e.g., a centrifugal fan that employs rotating impellers to accelerate gaseous cooling received at its intake and change the direction of the airflow). In operation, in the case of a cooling system 120A including an air mover (e.g., fan or blower), the air mover may cool information handling resources 116A of expansion chassis 98A by drawing cool air into expansion chassis 98A from the outside of expansion chassis 98A, expelling warm air from inside the enclosure to the outside of expansion chassis 98, and/or moving air across one or more heatsinks (not explicitly shown) internal to expansion chassis 98A to cool one or more information handling resources 116A.

In other embodiments, cooling system 120A may comprise mechanisms other than a blower for moving coolant, including liquid pumps, jets, and/or free convection enclosures.

In these and other embodiments, rotating and other components for moving coolant by cooling system 120A may be driven by a motor or other mechanical device. The rotational speed of such motor may be controlled by suitable control signals communicated from baseboard management controller 108 via external cable 128, as described in greater detail below. In these and other embodiments, cooling system 120A may be configured communicate (e.g., via external cable 128 as described in greater detail below) one or more signals to baseboard management controller 108 indicative of a health, status, and/or other telemetry information (e.g., an air mover speed) of cooling system 120A.

Temperature sensor 118A may be any system, device, or apparatus (e.g., a thermometer, thermistor, etc.) configured to communicate (e.g., via external cable 128 as described in greater detail below) a signal to baseboard management controller 108 indicative of a temperature within expansion chassis 98A. In many embodiments, expansion chassis 98A may comprise a plurality of temperature sensors 118A, wherein each temperature sensor 118 detects a temperature of a particular component and/or location within expansion chassis 98A. For example, one temperature sensor 118A may detect an ambient temperature of coolant entering expansion chassis 98A via cooling system 120A while another temperature sensor 118A may detect a temperature of one or more information handling resources 116A.

Host interconnect card 126A may comprise any suitable system, device, or apparatus configured to serve as a communication interface between expansion chassis 98A and main chassis 98. As shown in THE FIGURE, host interconnect card 126A may be configured to receive in-band signals from information handling resources 116A and/or send in-band signals to information handling resources 116A. In addition, host interconnect card 126A may be configured to receive sideband control signals from one or more of PSU 110A, temperature sensor 118A and cooling system 120A and/or send sideband control signals to one or more of PSU 110A, temperature sensor 118A and cooling system 120A.

As also shown in THE FIGURE, host interconnect card 126A may be coupled to host interconnect card 126 of main chassis 98, each via an external cable 128.

In addition to PSU 110A, cooling system 120A, temperature sensor 118A, and host interconnect card 126A, expansion chassis 98A may include one or more other information handling resources 116A. Such information handling resources 116A may include any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system. For example, in some embodiments, one or more information handling resources 116A may comprise PCIe devices.

In operation, in order to communicate in-band data between processor 103 and information handling resources 116A, processor 103 may communicate such data to host interconnect card 126, which may in turn communicate such data over one or more in-band signal channels of an external cable 128. Host interconnect card 126 may route the data to the appropriate external cable 128 based on suitable identifying information (e.g., metadata) embedded within such data. Such data may be received from external cable 128 at host interconnect card 126A, which in turn may forward such data to information handling resources 116A. In some embodiments, routing between inputs and outputs of host interconnect card 126A may be hardwired. Communication of in-band signals may also operate in reverse, from information handling resources 116A, to host interconnect card 126A, to one or more in-band signal channels of an external cable 128, to host interconnect card 126, terminating at processor 103.

In order to communicate control signals to one or more of PSU 110A, temperature sensor 118A, and cooling system 120A, baseboard management controller 108 may communicate appropriate control signals for such devices to host interconnect card 126, which in turn may communicate such control signals over one or more sideband channels of an external cable 128. Host interconnect card 126 may route the sideband control signals to the appropriate external cable 128 based on suitable identifying information (e.g., metadata) embedded within such sideband control signals. In some embodiments, routing between inputs and outputs of host interconnect card 126 may be hardwired. Such sideband control signals may be received from external cable 128 at host interconnect card 126, which in turn may forward such sideband control signals as appropriate to one or more of PSU 110A, temperature sensor 118A, and cooling system 120A.

Communication of sideband control signals may also operate in reverse, from one or more of PSU 110A, temperature sensor 118A, and cooling system 120A, to host interconnect card 126, to one or more sideband channels of an external cable 128, to host interconnect card 126, then to baseboard management controller 108.

Thus, using the methods and systems disclosed above, power, thermal, and/or other control signals may be passed from a single host within main chassis 98 through sideband channels available on external cables 128 coupled to host interconnect card 126 into one or more expansion chassis 98A to provide system-wide environmental management.

For example, physical air mover tachometer and speed control signals may be driven by baseboard management controller 108 through sideband channels of external cables 128 to enable air mover control in expansion chassis 98A. In addition, because information handling resources 116A are coupled to a host system (e.g., via PCIe, Inter-Integrated Circuit, etc.), baseboard management controller 108 may be capable of inventorying components of external chassis 98A, reading their temperatures, and communicating air mover speed changes to expansion chassis 98A, thus enabling both open and closed loop control within expansion chassis 98A.

Furthermore, power supply unit control signals may be communicated from main chassis 98, through external cables 128, into expansion chassis 98A.

Such systems and methods may eliminate the need for an integral baseboard management controller within each expansion chassis 98A and may enable the use of a chassis as either a host server or a motherboard-less expansion chassis without significant modification to much of the mechanical or electrical hardware to switch between operation as a main chassis 98 and an expansion chassis 98A or vice versa.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
    a main chassis comprising:
        a host system motherboard; and
        a first host interconnect card; and
    a motherboard-less expansion chassis comprising:
        a second host interconnect card communicatively coupled to the first host interconnect card via an external cable having one or more in-band signal channels and one or more sideband signal channels;
        a first information handling resource configured to communicate data with the host system motherboard via the one or more in-band signal channels; and
        a cooling system configured to communicate control signals with the host system motherboard via the one or more sideband signal channels, wherein the control signals comprise at least one of an air mover control signal indicative of a desired speed communicated from the host system motherboard to the cooling system and a speed signal indicative of a measured speed communicated from the cooling system to the host system motherboard.

2. The information handling system of claim 1, wherein the first information handling resource comprises a Peripheral Component Interconnect Express device.

3. An information handling system comprising:
    a main chassis comprising:
        a host system motherboard; and
        a first host interconnect card; and a motherboard-less expansion chassis comprising:
a second host interconnect card communicatively coupled to the first host interconnect card via an external cable having one or more in-band signal channels and one or more sideband signal channels;
a first information handling resource configured to communicate data with the host system motherboard via the one or more in-band signal channels; and
a temperature sensor configured to communicate control signals with the host system motherboard via the one or more sideband signal channels, wherein the control signals comprise a temperature signal indicative of a temperature measured by the temperature sensor.

4. An information handling system comprising:
a main chassis comprising:
a host system motherboard; and
a first host interconnect card; and
a motherboard-less expansion chassis comprising:
a second host interconnect card communicatively coupled to the first host interconnect card via an external cable having one or more in-band signal channels and one or more sideband signal channels;
a first information handling resource configured to communicate data with the host system motherboard via the one or more in-band signal channels; and
a power supply unit configured to communicate control signals with the host system motherboard via the one or more sideband signal channels, wherein the control signals comprise at least one of a power supply unit control signal for controlling operation of the power supply unit and a status signal indicative of a status of the power supply unit communicated from the cooling system to the host system motherboard.

5. A method comprising, in an information handling system comprising a main chassis having a host system motherboard and a motherboard-less expansion chassis:
disposing in the main chassis a first host interconnect card and coupling the first host interconnect card to the host system motherboard;
disposing in the expansion chassis a second host interconnect card;
coupling an external cable having one or more in-band signal channels and one or more sideband signal channels between the first host interconnect card and the second host interconnect card;
coupling the second host interconnect card to a first information handling resource of the expansion chassis such that the first information handling resource is configured to communicate data with the host system motherboard via the one or more in-band signal channels; and
coupling the second host interconnect card to a cooling system of the expansion chassis such that the cooling system is configured to communicate control signals with the host system motherboard via the one or more sideband signal channels, wherein the control signals comprise at least one of an air mover control signal indicative of a desired speed communicated from the host system motherboard to the cooling system and a speed signal indicative of a measured speed communicated from the cooling system to the host system motherboard.

6. The method of claim 5, wherein the first information handling resource comprises a Peripheral Component Interconnect Express device.

7. A method comprising, in an information handling system comprising a main chassis having a host system motherboard and a motherboard-less expansion chassis:
disposing in the main chassis a first host interconnect card and coupling the first host interconnect card to the host system motherboard;
disposing in the expansion chassis a second host interconnect card;
coupling an external cable having one or more in-band signal channels and one or more sideband signal channels between the first host interconnect card and the second host interconnect card;
coupling the second host interconnect card to a first information handling resource of the expansion chassis such that the first information handling resource is configured to communicate data with the host system motherboard via the one or more in-band signal channels; and
coupling the second host interconnect card to a temperature sensor of the expansion chassis such that the temperature sensor is configured to communicate control signals with the host system motherboard via the one or more sideband signal channels, wherein the control signals comprise a temperature signal indicative of a temperature measured by the temperature sensor.

8. A method comprising, in an information handling system comprising a main chassis having a host system motherboard and a motherboard-less expansion chassis:
disposing in the main chassis a first host interconnect card and coupling the first host interconnect card to the host system motherboard;
disposing in the expansion chassis a second host interconnect card;
coupling an external cable having one or more in-band signal channels and one or more sideband signal channels between the first host interconnect card and the second host interconnect card;
coupling the second host interconnect card to a first information handling resource of the expansion chassis such that the first information handling resource is configured to communicate data with the host system motherboard via the one or more in-band signal channels; and
coupling the second host interconnect card to a power supply unit of the expansion chassis such that the power supply unit is configured to communicate control signals with the host system motherboard via the one or more sideband signal channels, wherein the control signals comprise at least one of a power supply unit control signal for controlling operation of the power supply unit and a status signal indicative of a status of the power supply unit communicated from the cooling system to the host system motherboard.

9. An article of manufacture comprising:
a non-transitory computer readable medium; and
computer-executable instructions carried on the computer readable medium, the instructions readable by a processor, the instructions, when read and executed, for causing the processor to, in an information handling system comprising a main chassis having a host system motherboard and a first host interconnect card and a motherboard-less expansion chassis having a second host interconnect card communicatively coupled to the first host interconnect card via an external cable having one or more in-band signal channels and one or more sideband signal channels:

communicate data between the host system motherboard and a first information handling resource integral to the expansion chassis and via the one or more in-band signal channels; and communicate data between the host system motherboard and a cooling system integral to the expansion chassis and via the one or more sideband signal channels, wherein the control signals comprise at least one of an air mover control signal indicative of a desired speed communicated from the host system motherboard to the cooling system and a speed signal indicative of a measured speed communicated from the cooling system to the host system motherboard.

10. The article of claim 9, wherein the first information handling resource comprises a Peripheral Component Interconnect Express device.

11. An article of manufacture comprising:

a non-transitory computer readable medium; and computer-executable instructions carried on the computer readable medium, the instructions readable by a processor, the instructions, when read and executed, for causing the processor to, in an information handling system comprising a main chassis having a host system motherboard and a first host interconnect card and a motherboard-less expansion chassis having a second host interconnect card communicatively coupled to the first host interconnect card via an external cable having one or more in-band signal channels and one or more sideband signal channels:

communicate data between the host system motherboard and a first information handling resource integral to the expansion chassis and via the one or more in-band signal channels; and communicate data between the host system motherboard and a temperature sensor integral to the expansion chassis and via the one or more sideband signal channels, wherein the control signals comprise a temperature signal indicative of a temperature measured by the temperature sensor.

12. An article of manufacture comprising:

a non-transitory computer readable medium; and computer-executable instructions carried on the computer readable medium, the instructions readable by a processor, the instructions, when read and executed, for causing the processor to, in an information handling system comprising a main chassis having a host system motherboard and a first host interconnect card and a motherboard-less expansion chassis having a second host interconnect card communicatively coupled to the first host interconnect card via an external cable having one or more in-band signal channels and one or more sideband signal channels:

communicate data between the host system motherboard and a first information handling resource integral to the expansion chassis and via the one or more in-band signal channels; and communicate data between the host system motherboard and a power supply unit integral to the expansion chassis and via the one or more sideband signal channels, wherein the control signals comprise at least one of a power supply unit control signal for controlling operation of the power supply unit and a status signal indicative of a status of the power supply unit communicated from the cooling system to the host system motherboard.

\* \* \* \* \*